(12) United States Patent
Suzuki

(10) Patent No.: US 7,227,283 B2
(45) Date of Patent: Jun. 5, 2007

(54) ENGINE CONTROL APPARATUS

(75) Inventor: Michiyuki Suzuki, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 448 days.

(21) Appl. No.: 10/795,446

(22) Filed: Mar. 9, 2004

(65) Prior Publication Data
US 2004/0232772 A1 Nov. 25, 2004

(30) Foreign Application Priority Data
Mar. 11, 2003 (JP) ............ P. 2003-064603

(51) Int. Cl.
H02H 11/00 (2006.01)
B63H 21/22 (2006.01)
B63H 23/00 (2006.01)
B63H 21/21 (2006.01)

(52) U.S. Cl. .................... 307/326; 440/1; 440/84

(58) Field of Classification Search ............... 307/326; 440/84, 85, 87
See application file for complete search history.

(56) References Cited

U.S. PATENT DOCUMENTS

| 5,171,171 | A | * | 12/1992 | Tani ................ 440/1 |
| 5,433,096 | A | | 7/1995 | Janssen et al. |
| 5,632,168 | A | | 5/1997 | Yano |
| 5,803,043 | A | | 9/1998 | Bayron et al. |
| 5,819,564 | A | | 10/1998 | Watanuki |
| 6,352,045 | B1 | * | 3/2002 | Takashima ......... 114/55.5 |
| 6,772,061 | B1 | | 8/2004 | Berthiaume et al. |
| 7,014,517 | B2 | * | 3/2006 | Suzuki ............... 440/1 |
| 7,026,912 | B2 | * | 4/2006 | Suzuki ............... 340/5.62 |
| 2004/0135670 | A1 | | 7/2004 | Guba |
| 2004/0232772 | A1 | | 11/2004 | Suzuki |

FOREIGN PATENT DOCUMENTS

| JP | A 2001-088789 | 4/2001 |
| JP | 2001-146148 A | 5/2001 |

* cited by examiner

Primary Examiner—Robert L. Deberadinis
Assistant Examiner—Hal I. Kaplan
(74) Attorney, Agent, or Firm—Sughrue Mion, PLLC

(57) ABSTRACT

The engine control apparatus includes: the stop switch body 6; the stop switch knob 3; the lock plate 5 insertable to the stop switch knob 3; the transponder 9 that is provided at the lock plate 5 side and that can transmit an ID code; and the control section 11 for receiving the ID code transmitted from the transponder 9 to control the engine operation. The engine control apparatus includes such that, when the lock plate 5 is disengaged from the stop switch knob 3, the stop switch body 6 is activated to cause the engine to stop or to be in an idling state. In the engine control apparatus, the control section 11 changes the engine performance based on the ID code from the transponder 9.

8 Claims, 4 Drawing Sheets

ENGINE CONTROL APPARATUS

BACKGROUND OF THE INVENTION

The present invention relates to an engine control apparatus including such that, when a lock plate is disengaged from a stop switch knob, the stop switch is turned on to allow an engine of a small motorboat or the like to stop or to be in an idling state.

A small motorboat is made to glide over water while taking a sharp turn or jumping so that an operator can enjoy a ride. This frequently causes the operator to fall into water. Due to this reason, it is required to, when the operator falls into water, stop the engine to prevent only the small motorboat from further progressing. Thus, a small motorboat is generally provided with a stop switch for allowing, when the operator falls into water, the engine to stop or to be in an idling state.

Specifically, a handle bar of the small motorboat is fixed with a switch case. The switch case has a stop switch knob for activating a stop switch of an insertable resin-made lock plate that has the base end a tightened wire. The tip end of the wire is fixed to the wrist or the like of the operator so that, when the operator falls into water, the lock plate is disengaged from the stop switch knob to turn on the stop switch, thereby allowing the engine of the small motorboat to stop or to be in an idling state.

As described above, the lock plate is inserted around the stop switch knob to allow the engine to start. This causes a situation where, when another lock plate of a smaller motorboat or a plate member having a similar shape is inserted, a third party can start the engine without the owner's permission. In order to prevent such a situation, which can result in the motorboat being stolen, a conventional technique (as disclosed in Patent reference 1 (Japanese Published Unexamined Patent Application No. 2001-88789), for example) proposes a control section in which a transponder incorporating an ID code is embedded in a lock plate and having inside the switch case an antenna that can receive the ID code so that the engine is controlled based on the received information.

The above conventional engine control apparatus is such that the ID code of the transponder is transmitted via radio transmission to the antenna and the received information is transmitted to the control section so that the engine is started only when a previously registered regular ID code and the received ID code coincide. When the former is different from the latter, the engine is not started. This can start the small motorboat only when the regular lock plate is inserted to the stop switch knob and thus can prevent the boat from being stolen.

However, the above conventional engine control apparatus includes such that the engine is not started when the a previously registered regular ID code by the control section is different from the received ID code. This causes an inconvenience as described below, although the boat can be prevented from being stolen.

Specifically, when the engine of the small motorboat, or other vehicle, capable of running at a high speed is set suitable for a beginner, then such a setting is not sufficient for an experienced user, although such a high-speed boat causes a danger to a beginner unaccustomed to handling the boat. In such a case, a switch, or similar mechanism, may be provided in the small motorboat for switching between an experienced user mode and a beginner mode. However, this requires the operator to use the switch to change the mode before running, thus causing the operation to be complicated.

SUMMARY OF THE INVENTION

The present invention is made in view of the above. It is an object of the present invention to provide an engine control apparatus that can automatically change the engine performance depending on the skill level of the operator.

The present invention according to Aspect 1 is: an engine control apparatus, including: a stop switch body for allowing an engine to stop or to be in an idling state; a stop switch knob that abuts with the stop switch body to activate the stop switch body to allow the engine to stop or to be in an idling state; a lock plate insertable to the stop switch knob; a transponder that is provided at the lock plate side and that can transmit a predetermined ID code; and a control section that can receive the ID code transmitted from the transponder and that controls the engine operation based on the ID code; wherein the engine control apparatus is characterized in that: when the lock plate is disengaged from the stop switch knob, the stop switch body is activated to allow the engine to stop; and the control section changes the engine performance based on the ID code from the transponder.

According to the present invention according to Aspect 2 an engine control apparatus according to Aspect 1 is characterized in that the transponder is detachably attached to the lock plate or the vicinity thereof.

DETAILED DESCRIPTION OF THE PREFERRED EMBODIMENTS

Hereinafter, embodiments of the present invention will be specifically described with reference to the drawings.

Figure 1:
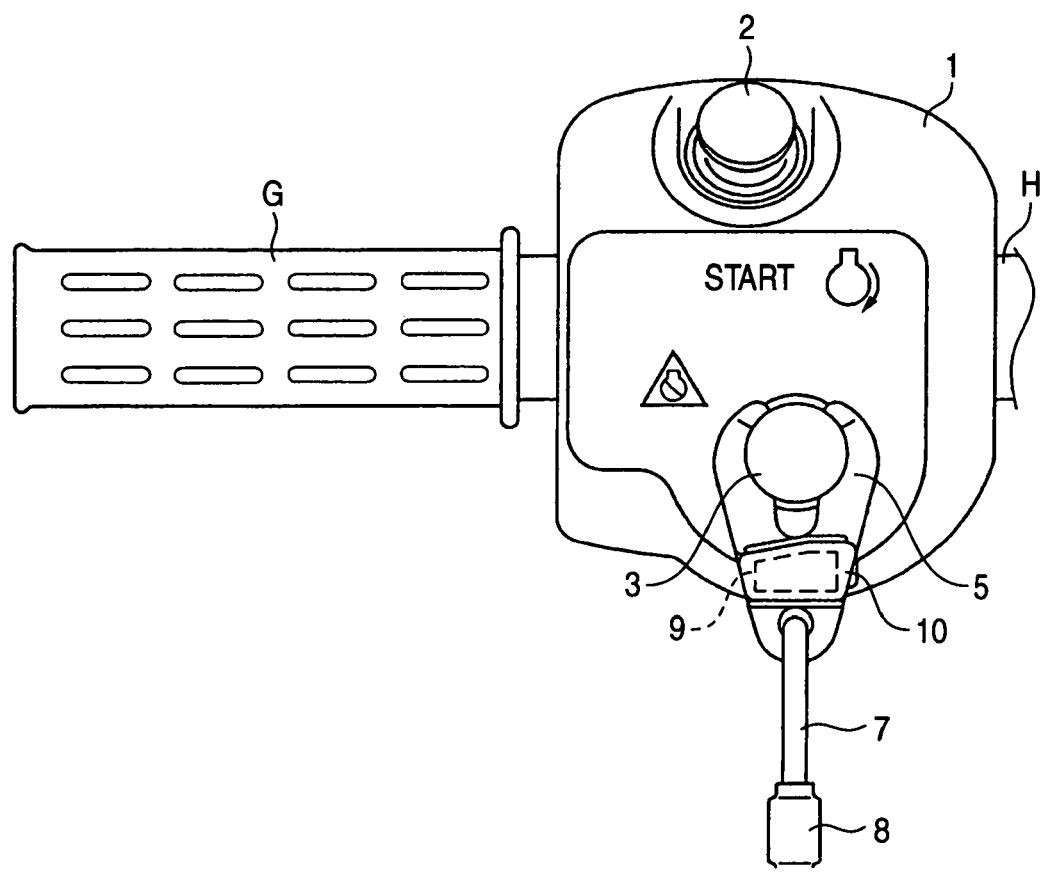
FIG. 1 is a top view illustrating the engine control apparatus for the small motorboat according to Embodiment 1 of the present invention.
Figure 2:
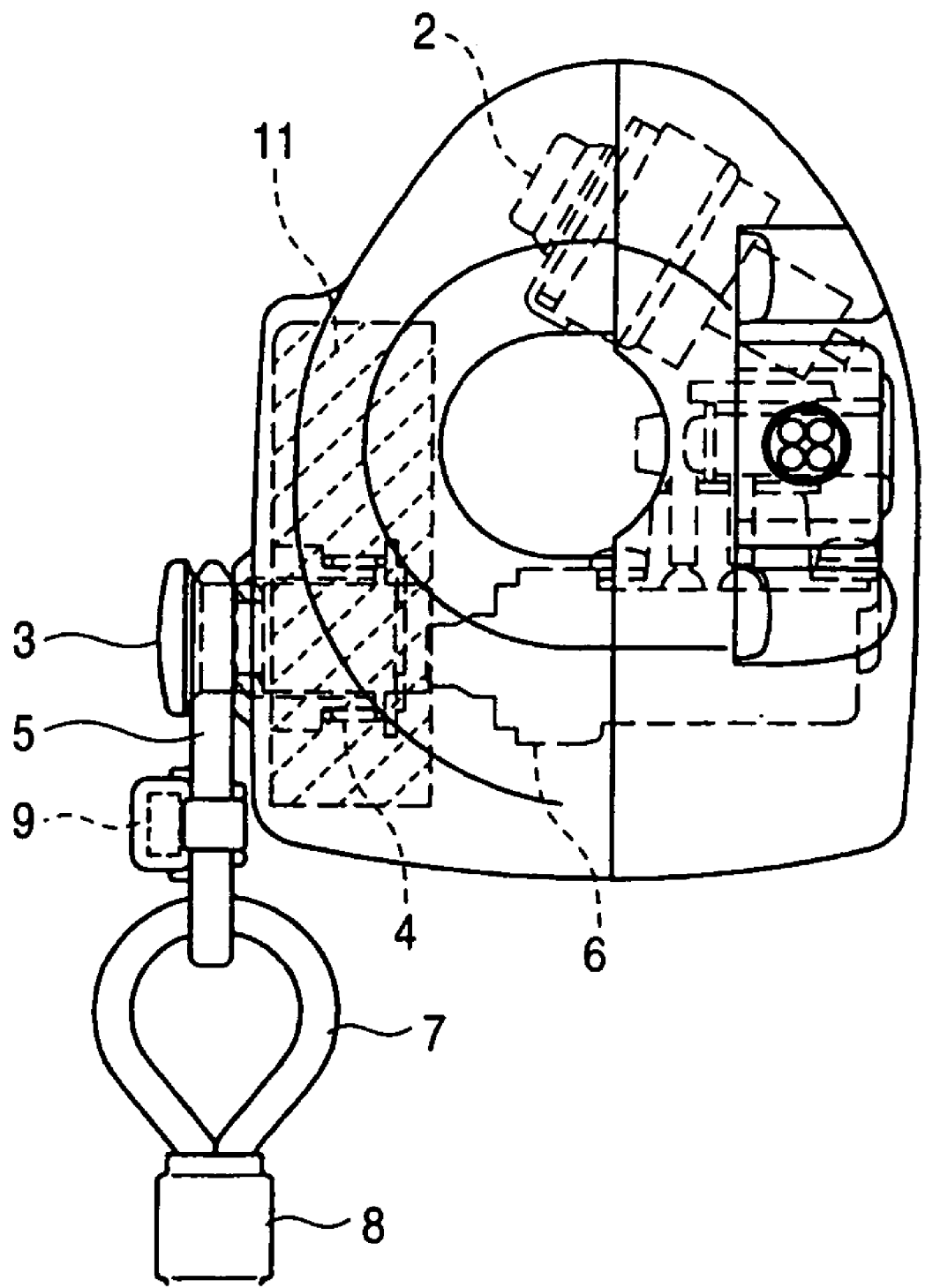
FIG. 2 is a right side view of FIG. 1.

As shown in FIG. 1 and FIG. 2, the engine control apparatus for the small motorboat according to this embodiment is provided in the resin-made switch case 1 fixed to the handle bar H of the small motorboat. The switch case 1 provides the start switch knob 2, the stop switch knob 3, the stop switch body 6, and the control section 11. The reference numeral G in FIG. 1 denotes a grip that is grasped by an operator when the operator drives the boat.

The start switch knob 2 is used to start the engine of the small motorboat. The knob is such that, when the knob is pushed, then power is obtained to start the engine. The start switch knob 2 can be provided to the switch case 1 with an arbitrary position and inclination angle.

As shown in FIG. 2, the stop switch knob 3 is always biased by the spring 4 toward the direction adjacent to the surface of the switch case 1 (right direction in the same drawing). When the lock plate 5 (which will be described later) is inserted between the surface of the switch case 1 and the projection of the stop switch knob 3 (as shown in the same drawing), then the base end of the stop switch knob 3 (right tip end in the same drawing) is separated from the stop switch body 6.

The stop switch body 6 is provided in the switch case 1 and is activated when abutting with the base end of the stop switch knob 3 to allow the engine of the small motorboat to stop or to be in an idling state. Thus, when the lock plate 5 is disengaged from the stop switch knob 3, the stop switch body 6 is activated to allow the engine of the small motorboat to be forcedly stopped or to be in an idling state.

Figure 3:
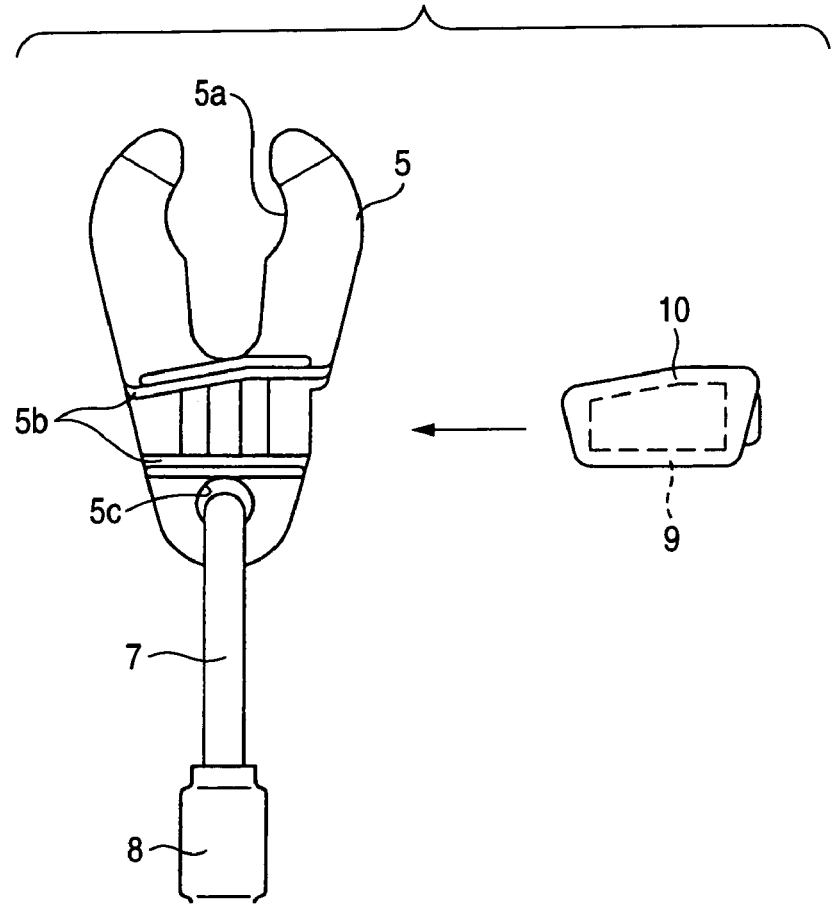
FIG. 3 is a top view illustrating the lock plate and the attachment of the engine control apparatus for the small motorboat according to Embodiment 1 of the present invention.

The lock plate 5 includes a resin-made plate-like member and forms, as shown in FIG. 3, the notch 5a at one end in the plan view. The lock plate 5 also has at the substantial center two convex sections 5b and has at the other end of the plan view a hole 5c to which the wire 7 is inserted. The tip end of the wire 7 (not shown) is designed to be attached to the wrist or the like of an operator of the small motorboat.

When the notch 5a is engaged with or separated from the periphery side of the stop switch knob 3, the lock plate 5 can be inserted around the stop switch knob 3. This allows, when the operator falls into water, the lock plate 5 to be disengaged from the stop switch knob 3 via the wire 7. In the drawing, the reference numeral 8 denotes a circular ring-shaped metal fitting for inserting the tip end of the wire 7 into the hole 5c.

Figure 4:
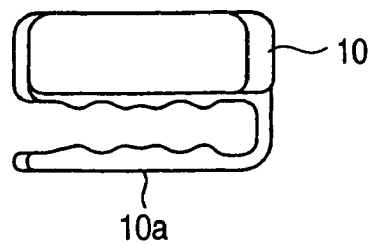
FIG. 4 is a front view illustrating the attachment of the engine control apparatus for the small motorboat according to Embodiment 1 of the present invention.

The two convex sections 5b formed at the lock plate 5 have a groove-like shape over the surface of the lock plate 5 to which the resin-made attachment 10 incorporating the transponder 9 can be attached. Specifically, this attachment 10 has at the lower face the clip section 10a as shown in FIG. 4. The attachment 10 is such that, when the clip section 10a sandwiches the top and back face of the lock plate 5 (more specifically, the space between the two convex sections 5b), the attachment 10 can be attached.

The transponder 9 is provided at the lock plate 5 side to hold a predetermined ID code and can transmit the ID code from an antenna (not shown) via radio transmission. The ID code includes information for providing an arbitrary engine performance. The engine performance includes, for example, the engine performance for a beginner or one for an experienced user.

Specifically, the lock plate 5 of the small motorboat driven by a beginner is attached with the transponder 9 including the ID code specifying that the engine provides a performance for the beginner (according to which the boat basically runs at a low speed or a response to a depressed accelerator is slow). On the other hand, the lock plate 5 of the small motorboat driven by an experienced user is attached with the transponder 9 including the ID code specifying that the engine provides a performance for the experienced user (according to which the boat basically runs at a high speed or the response to a depressed accelerator is fast).

Specifically, the transponder 9 is incorporated in the attachment 10 but is separately provided from the lock plate 5. In the case where the attachment 10 has the transponder 9 including an ID code suitable to an operator, the operator can easily select the engine performance corresponding to the operator's preference. In this embodiment, the lock plate 5 is engaged with the stop switch knob 3 to subsequently activate the start switch knob 2, thereby allowing the engine to be initially in an idling state.

The control section 11 is provided at the vicinity of the stop switch body 6 in the switch case 1, can receive an ID code transmitted from the transponder 9, and controls an operation of the engine of the small motorboat. Specifically, a plurality of transponders 9 having various ID codes are prepared so that the operator can select an arbitrary one to attach to the lock plate 5, thereby providing the engine performance in accordance with the operator's preference.

In this way, this embodiment allows the control section 11 to change the engine performance based on the ID code from the transponder 9 and allows the transponder 9 to be detachably attached to the lock plate 5. This allows the operator to easily exchange the transponder 9 according to need. Thus, the engine performance can be changed in accordance with the operator's preference in an easy manner.

Figure 5:
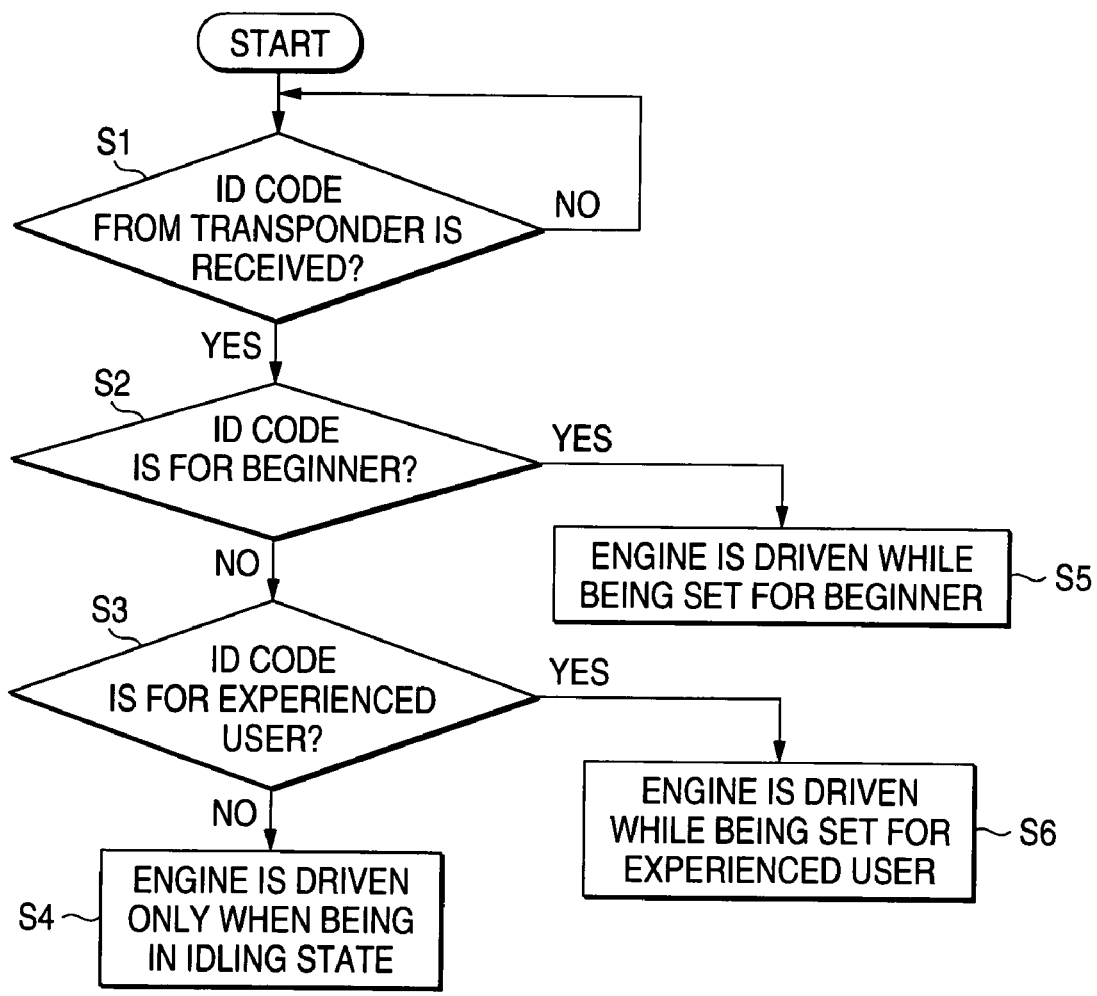
FIG. 5 is a flowchart illustrating control details by the control section in the engine control apparatus for the small motor boat according to Embodiment 1 of the present invention.

For example, when receiving the ID code from the transponder 9 as shown in FIG. 5 (S1), then the control section 11 determines whether the engine performance corresponding to the ID code should be the one for a beginner or not (S2). When it is determined that the engine performance corresponding to the ID code should be the one for a beginner, then the process proceeds to S5 in which the engine performance is set for a beginner while the engine is being driven.

On the other hand, when the ID code received in S2 is determined as not for a beginner, then the process proceeds to S3 to determine whether the engine performance corresponding to the ID code should be one for an experienced user or not (S3). When it is determined that the ID code is for an experienced user, then the process proceeds to S6 in which the engine performance is set for an experienced user while the engine is being driven.

When the received ID code is not one for the previously registered beginner or experienced user, then the process proceeds to S4 in which the engine is controlled so as to be driven only when being in an idling state. Specifically, when the ID code received by the control section 11 is not the previously registered regular one, then the engine of the small motorboat is allowed to be in an idling state. This prevents the boat from being stolen to some extent and also prevents a burden where the engine is caused to repeat starting and stopping operations, thus allowing the engine to have a longer life.

The embodiment is described as in the above, however, the present invention is not limited to this. For example, the transponder 9 also may be incorporated in the lock plate 5 and the lock plate 5 itself can be exchanged by the operator. The attachment 10 incorporated the transponder 9 may also be provided at any position in a range in which the transponder 9 and the control section 11 can have communication (i.e., in the vicinity of lock plate 5). Although this embodiment is applied to a small motorboat, this embodiment may also be applied to other machines (e.g., ATV or snowmobile). The engine performance settings are not limited to the two kinds of one for a beginner and one for an experienced user. The engine performance may also be set for three or more levels, including one for racing, one for an experienced user (high performance), one for a general user (cruise), one for a beginner (course), or one for children (run), for example.

According to the present invention of Aspect 1, the control section for controlling the engine operation changes the engine performance based on the ID code from the transponder. This allows the engine performance to automatically be changed depending on the operator, thus improving operation in response to the change.

According to the present invention of Aspect 2 the transponder is detachably attached to the lock plate or in the vicinity thereof, thus allowing the operator to easily exchange the transponder according to need. Specifically, the engine performance can arbitrarily be changed depending on the operator's preference in an easy manner.

What is claimed is:

1. An engine control apparatus comprising:
   a stop switch body for allowing an engine to stop or to be in an idling state;
   a stop switch knob that abuts with the stop switch body to activate the stop switch body to allow the engine to stop or to be in an idling state;
   a lock plate including an attachment member for attaching the lock plate to an operator, wherein the lock plate is detachably engaged with the stop switch knob so that, when the operator pulls the lock plate via the attachment member, the lock plate disengages from the stop switch knob;
   a transponder that transmits a predetermined ID code and is detachably attached to the lock plate or other structures on the engine control apparatus; and
   a control section that receives the ID code transmitted from the transponder and that controls the engine operation based on the ID code, wherein
   when the lock plate is disengaged from the stop switch knob, the stop switch body is activated to stop the engine or put the engine in an idling state.

2. The engine control apparatus according to claim 1, wherein the start switch knob is provided to a switch case at an inclination angle from vertical.

3. The engine control apparatus according to claim 1, wherein said transponder is a first transponder and said ID code is a first ID code based upon which the control section controls the engine performance in a first manner when the first transponder is attached to the lock plate and the lock plate is engaged with the stop switch knob;
   wherein the control apparatus further comprises a second transponder having a second ID code based upon which the control section controls the engine performance in a second manner different from the first manner when the second transponder is attached to the lock plate and the lock plate is engaged with the stop switch knob; and
   wherein the control apparatus is configured to be operable with either the first transponder or the second transponder selectively attached so as to control the engine performance in accordance with the selectively attached first or second transponder.

4. The engine control apparatus according to claim 3, wherein the control section controls the engine based on the first ID code so that the engine runs at a relatively lower speed compared to the engine speed when the control section controls the engine based on the second ID code.

5. The engine control apparatus according to claim 3, wherein the control section controls the engine based on the first ID code so that the engine responds to actuation of an accelerator in a relatively longer time compared to the engine response time to actuation of the accelerator when the control section controls the engine based on the second ID code.

6. The engine control apparatus according to claim 1, wherein when the control section receives an unrecognized ID code, the control section controls the engine to be only in an idling state.

7. The engine control apparatus according to claim 1, wherein the transponder is detachably attached to the lock plate.

8. The engine control apparatus according to claim 1, wherein the control section controls the engine performance based on the ID code transmitted from the transponder.

* * * * *